United States Patent [19]
Bedo et al.

[11] 3,761,053
[45] Sept. 25, 1973

[54] HIGH PRESSURE VALVE

[75] Inventors: Alfred Bedo, Walton Hills; Edward Beck, Cleveland Heights, both of Ohio

[73] Assignee: Sno-Trik Company, Solon, Ohio

[22] Filed: July 24, 1972

[21] Appl. No.: 274,517

Related U.S. Application Data

[63] Continuation-in-part of Ser. No. 862,804, Oct. 1, 1969, Pat. No. 3,679,169.

[52] U.S. Cl............. 251/88, 251/DIG. 1, 251/122, 251/357
[51] Int. Cl........................................ F16k 29/00
[58] Field of Search ............... 251/84, 86, 88, 357; 287/90 R, 90 D, 91

[56] References Cited
UNITED STATES PATENTS

| | | | |
|---|---|---|---|
| 3,049,332 | 8/1962 | Webster | 251/88 |
| 1,326,430 | 12/1919 | Walsh | 251/88 |
| 3,572,633 | 3/1971 | Gaffney | 251/88 X |
| 1,411,904 | 4/1922 | Bloch | 251/86 |
| 632,502 | 9/1899 | Monnier | 251/88 X |

FOREIGN PATENTS OR APPLICATIONS

| | | | |
|---|---|---|---|
| 545,281 | 10/1922 | France | 251/88 |

*Primary Examiner*—Alan Cohan
*Assistant Examiner*—Gerald A. Michalsky
*Attorney*—Albert P. Sharpe, III

[57] ABSTRACT

A high pressure valve employing a nonrotating needle. The valve actuating stem is threadedly received in a liner sleeve of the valve packing nut. The inner end of the actuating stem is provided with means forming a bore. A valve needle including an enlarged spherical member is adapted to be received in the bore. Essentially line contact is provided between the bearing surfaces of the valve needle and of the actuating stem by the presence of the spherical member between the stem and the valve. Additionally, certain embodiments include means for adjusting the "play" between the stem and the valve while permitting the valve to be freely rotatable relative to the stem.

7 Claims, 13 Drawing Figures

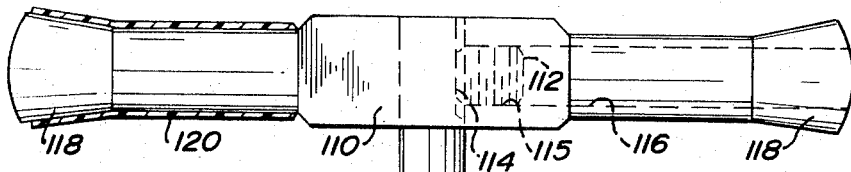
PATENTED SEP 25 1973
3,761,053
SHEET 1 OF 4
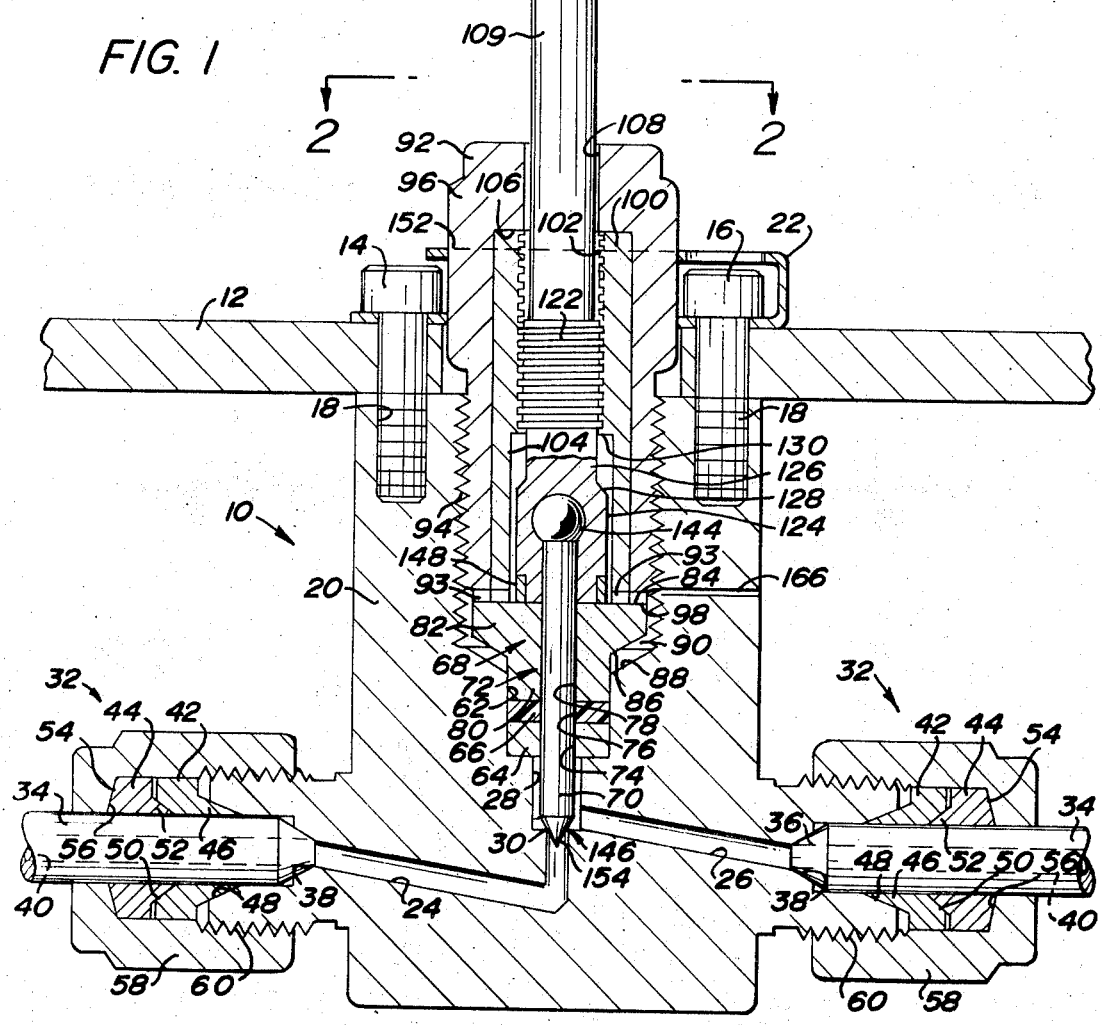
FIG. 1
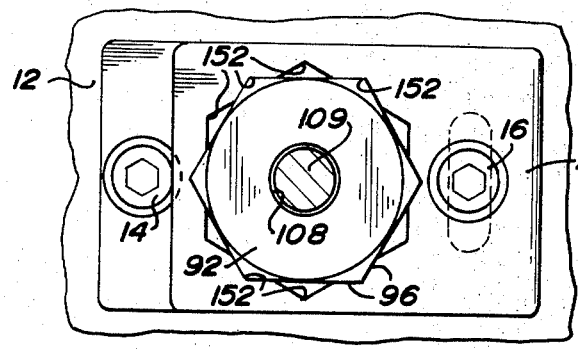
FIG. 2

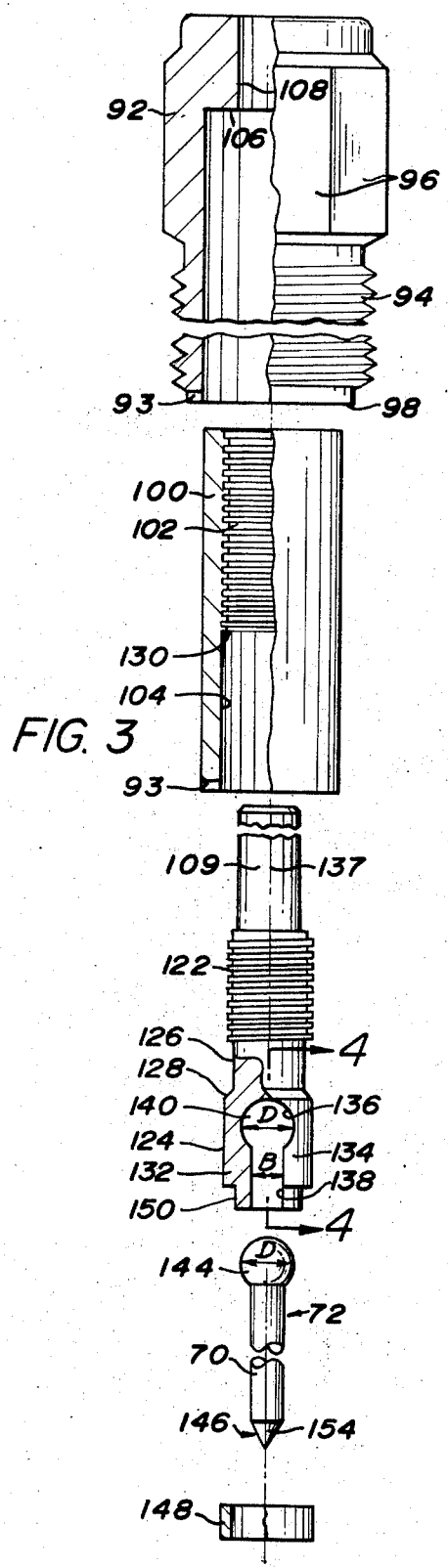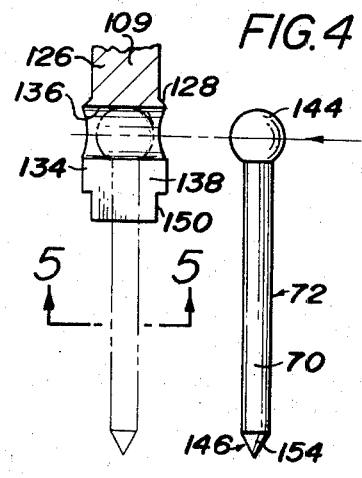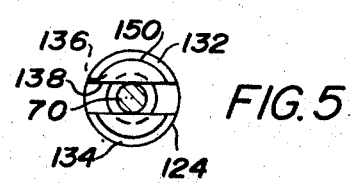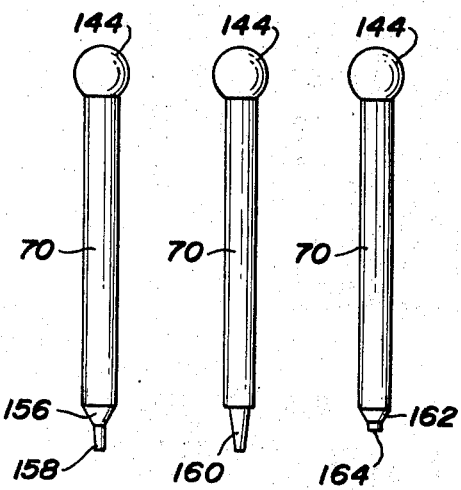
FIG. 3
FIG. 4
FIG. 5
FIG. 6  FIG. 7  FIG. 8

HIGH PRESSURE VALVE

BACKGROUND OF THE INVENTION

This application is a Continuation-in-Part of application Ser. No. 862,804, filed Oct. 1, 1969, now U.S. Pat. No. 3,679,169.

This invention relates to a high pressure valve and more particularly to a high pressure valve of the nonrotating needle type.

Needle valves are particularly useful in industry for regulating the flow of fluids under pressure, especially in the operation of sensitive instruments. This type of valve employs a slender needle which is adapted to be brought into and out of contact with a valve seat. The valve seat itself is located between inlet and outlet passageways in the valve body. The needle therefore acts as a means either for controlling the flow rate of fluid through the valve body, and/or for interrupting the flow altogether. Thus, depending upon the design of the needle, flow of fluid through the body may be either metered or controlled, or shut off entirely.

The basic design of prior art needle valves employs a valve actuating stem threadedly received within the packing nut of the valve or within the valve body directly. The needle is adapted to be carried by the actuating stem such that rotation of the valve handle will bring the needle tip into and out of engagement with the valve seat. Depending upon the particular connecting means between the needle and the valve stem, the needle may be either of the rotating or nonrotating type.

If the needle is rigidly connected to the valve stem, the needle tip will rotate with rotation of the stem. Alternately, if a lost motion connection is provided between the needle and the stem, rotation of the stem will not impart rotation to the needle. In the nonrotating needle type of valve structure, rotary motion of the valve stem is transformed into linear motion of the needle thus moving the nonrotating needle tip into and out of engagement with the valve seat.

The nonrotating needle has obvious advantages over the rotating needle. In the rotating needle structure, severe scoring of the valve seat may take place as the needle tip is brought into engagement with the seat. This scoring occurs as the needle tip is wiped across the valve seat in closing of the valve, and severely affects the reliability of the seal at the valve seat. Such scoring is all but eliminated when the valve needle is rendered nonrotating with respect to the valve seat and is brought into and out of engagement with the valve seat by a direct linear motion.

Several difficulties in prior art valves of the nonrotating needle type have been encountered in industry, one of the more common difficulties being that the needle itself is not readily removable in the event that it is damaged. It is not uncommon in prior art needle valves to find that the actuating stem and needle combination must be replaced in the event of damage to the needle since the needle is captured upon the actuating stem by upsetting a portion of the stem end about the needle. Replacement of the needle itself is thus virtually impossible in view of the difficulty of removing the damaged needle without significant damage to the stem.

Another problem of prior art needle valve designs is that the needle is not always rendered nonrotating with respect to the stem. In certain prior art designs, frictional effects may produce a slight amount of rotation of the needle with rotation of the stem resulting in undesirable scoring of the valve seat. Such frictional effects are inherent in the types of connections provided between the needle and the stem of certain prior art needle valves.

An additional problem of prior art needle valves is the pressure limitation of such valves. Where alignment of the needle with respect to the axis of the valve seat is not accurately maintained, a definite pressure limitation is placed on the valve depending upon the degree of misalignment of the needle, the degree of wear in the valve seat and other factors. Consequently, many prior art needle valve designs are not suitable for high pressure application because of needle misalignment.

Also related to pressure limitations in prior art needle valves are the limitations imposed by sealing about the needle. In many prior art designs, the sealing structure about the needle body is ineffective for high pressure application.

A still further problem present in prior art needle valve designs has been the difficulty of providing a nonrotatable type which does not have "backlash" movement of the needle relative to the stem. As can be appreciated, when a rotatable type connection is provided between the valve stem and the needle itself, there must be some play present. Depending upon the amount of play, the stem can move suddenly a very slight amount during an opening operation. This backlash movement can adversely affect a throttling operation since there may be a sudden increase in the flow passage due to the backlash movement.

BRIEF SUMMARY OF THE INVENTION

Briefly summarized, this invention relates to a high pressure valve of the nonrotating needle type and to structures which overcome the noted backlash problems.

In the preferred embodiment of the apparatus of this invention, the valve stem is threadedly received within a liner sleeve of the packing nut. Threads are provided on the actuating stem which mate with comparable threads on the packing nut liner sleeve. The inner end of the actuating stem is provided with means which define a cylindrical bore. The bore can be formed directly in the stem or by a separate member connected to the stem.

A valve needle is carried by the stem and includes an enlarged spherical member adapted to be received in the cylindrical bore of the stem in essentially line contact relationship. The member is preferably a ball and can be formed on the end of the needle or as a separate element. The inner end of the needle is provided with a tip adapted to cooperate with the valve seat to provide either a metering, control or shut-off function. Adjustable means are provided for maintaining the needle valve and the stem under a desired engagement so that the valve can rotate freely relative to the stem but with substantially no axial play. Several embodiments of the adjustable means are disclosed. Each of the embodiments allow the effective length of the bore to be varied.

Accordingly, a primary object of the invention is the provision of a nonrotatable type high pressure needle valve in which the axial play between the needle valve and the actuating stem can be adjusted to substantially eliminate the movement while permitting free relative rotation.

Yet another object is the provision of a needle valve of the general type described wherein the valve needle and the stem are in engagement through substantially line contact and the needle is permitted to have free relative rotation with the stem through a ball type connection.

Yet another object is the provision of a nonrotatable type needle valve in which the needle valve has an end portion carried within the stem in a bore, the axial length of which can be selectively varied to eliminate axial play between the needle valve and the stem.

BRIEF DESCRIPTION OF THE DRAWINGS

The above and other objects and advantages will become apparent from the following description when read in conjunction with the accompanying drawings wherein:

FIG. 1 is an elevational cross-sectional view of a valve embodying the principles of this invention;

FIG. 2 is a fragmentary plan elevational view, partially in section, taken along the line 2—2 of FIG. 1;

FIG. 3 is an exploded view, in partial section, of a valve actuating stem and packing nut embodying the principles of this invention;

FIG. 4 is a sectional view taken along the line 4—4 of FIG. 3 and including in addition in phantom outline the respective positions of the needle as it is inserted into the bifurcated end of the stem;

FIG. 5 is a sectional view taken along the line 5—5 of FIG. 4;

FIG. 6 is an elevational view of an illustrative alternate embodiment of the needle;

FIG. 7 is an elevational view of a further illustrative alternate embodiment of the needle;

FIG. 8 is an elevational view of a still further illustrative alternate embodiment of the needle;

DESCRIPTION OF THE VALVE

Figure 9:
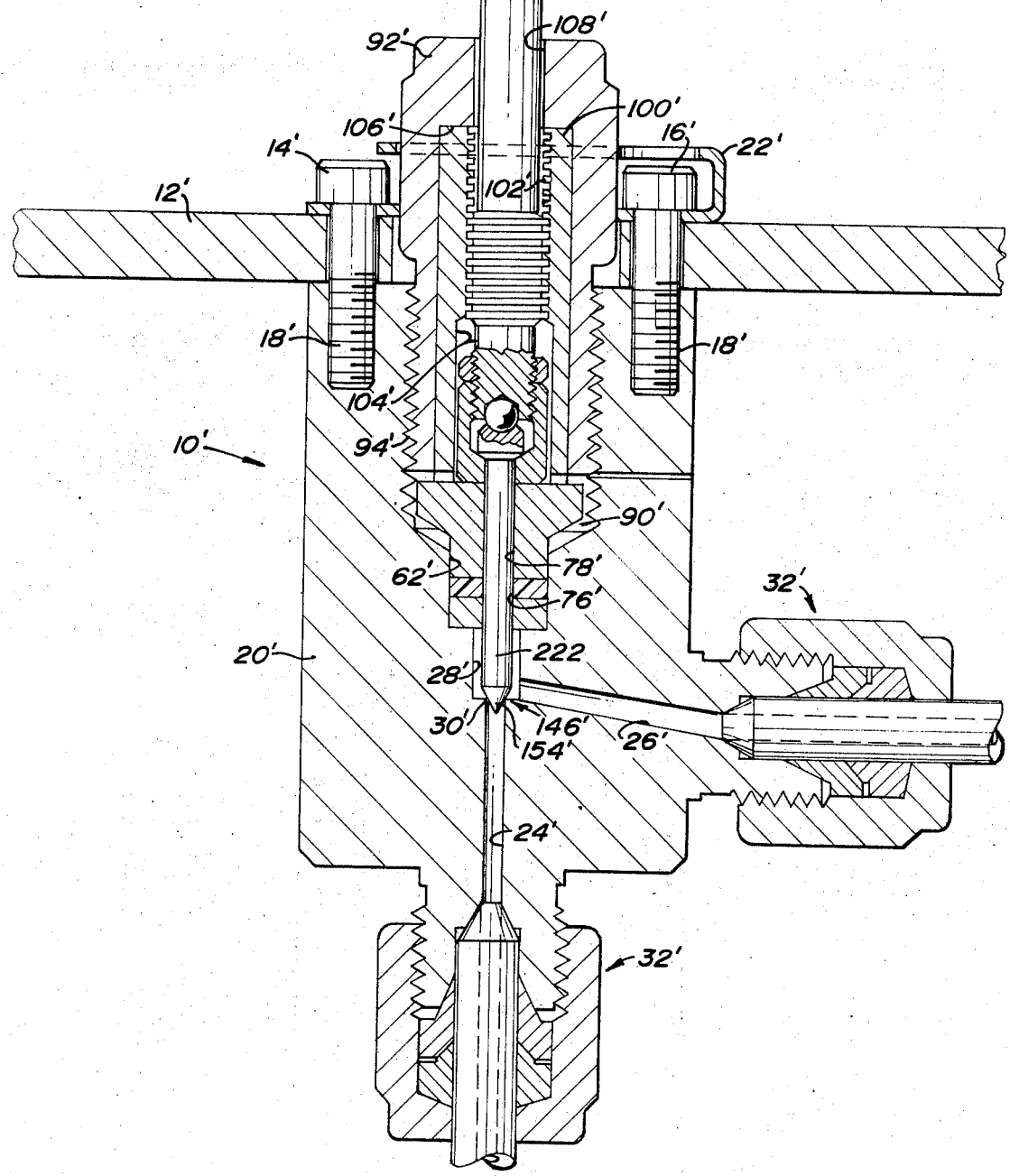
FIG. 9 is an elevational view of a second embodiment of a high pressure needle valve incorporating principles of the invention.

Turning now to FIG. 1, the preferred embodiment of the apparatus of this invention will now be described in detail.

In FIG. 1, there is shown a valve 10 secured to support 12 by means of cap screws 14, 16. Cap screws 14, 16 extend through support 12 and into tapped holes 18 of valve body 20. Captured between the heads of cap screws 14, 16 and support 12 is a keeper 22 whose function will be described in greater detail as the description proceeds.

Valve body 20 is provided with inlet and outlet passageways 24, 26, respectively, which intersect bore 28. A valve seat 30 is defined at the intersection of inlet passage 24 and bore 28.

Tube couplings or other suitable connections are provided at 32 for the respective inlet and outlet passageways 24, 26 in order that tubes or other flow lines 34 may be secured to the valve body.

TUBE COUPLINGS

Briefly describing the tube couplings 32 of FIG. 1, it will be seen that each tube 34 is provided with a conical end 36 which engages a generally frusto-conical sealing surface 38 defined by the valve body 20. A bore 40 extends through each tube 34 and is in communication with a respective passageway 24, 26. The external surface of each tube is gripped by a pair of ferrules 42, 44. Front ferrule 42 is defined by a generally frusto-conical nose portion 46 which engages camming mouth 48 defined by the valve body 20. The back face of front ferrule 42 defines a camming mouth 50 in which is received nose 52 of back ferrule 44. The back face 54 of back ferrule 44 is engaged by thrust surface 56 of coupling nut 58.

In making up the tube couplings 32, the ferrules 42, 44 are initially positioned as shown in FIG. 1 with the coupling nut 58 advanced over the threads 60 of the valve body a distance sufficient to impose a finger tight load on the ferrules. Thereafter, tube 34 is inserted into the coupling nut and valve body a distance sufficient to permit the conical end 36 to be seated against sealing surface 38 in initial non-pressure contact. Upon initial torquing of coupling nut 58, a longitudinal thrust will be imparted to back ferrule 44 by means of the thrust surface 56. Back ferrule 44 will in turn exert a substantially axial thrust against the front ferrule 42. Front ferrule 42 consequently will be forced into engagement with camming mouth 48. As a consequence of further torquing of the coupling nut 58, nose 46 of front ferrule 42 will be progressively wedged or cammed inwardly into engagement with the exterior surface of tube 34.

With further torquing of coupling nut 58, the front ferrule 42 will continue to move forwardly and inwardly, but at a reduced rate as a result of the increased resistance imposed by the surface of tube 34 and camming mouth 48. As resistance to movement of front ferrule 42 continues to build up, and the rate of front ferrule movement slows, the stiffness of the relatively short nose 52 of back ferrule 44 will be gradually overcome, as a result of which a progressively inward wedging or camming of the nose 52 of back ferrule 44 into engagement with the surface of tube 34 will commence.

The action of the ferrules just described is sequential in nature providing for time coordinated gripping by the front and back ferrules during take-up. The deformation of the ferrules also induces preloading in the tube end forcing the conical end 36 into sealing engagement with sealing surface 38. Various parameters are taken into account in the design of the coupling of FIG. 1 so as to produce the degree of preloading necessary to effect a seal at the sealing surface 38 sufficient to withstand the maximum working pressure for which the fitting is rated.

for a more detailed description of the tube coupling 32 just outlines, reference is made to application Ser. No. 760,576, now U.S. Pat. No. 3,584,900, assigned to the Sno-Trik Company of Cleveland, Ohio.

VALVE BODY

Attention will now be directed to the interior of valve body 20 where it will be seen from FIG. 1 that bore 28 is enlarged at counterbore 62 to receive a seal washer 64, a sealing member 66, and an alignment bushing 68. Projecting through the respective members 64, 66, 68 is the cylindrical body 70 of the valve needle 72.

For washer 64 is generally annular in shape having an outside outlined, slightly less than the diameter of counterbore 62 and a circular passageway 74 which has a diameter slightly in excess of the outside diameter of cylindrical body 70 for a purpose to be described more fully hereafter.

Sealing member 66, which in the preferred embodiment of this invention is manufactured from glass-filled TEFLON, is generally annular in shape and like seal washer 64 has an outside diameter slightly less than the diameter of counterbore 62 with a circular passageway 76 slightly larger than the outside diameter of cylindrical body 70.

Alignment bushing 68 includes a forward portion 80 having an outside diameter slightly less than the diameter of counterbore 62 and a circular passageway 78 having a diameter slightly in excess of the outside diameter of cylindrical body 70. Alignment bushing 68 also includes a flange portion 82 defining a thrust surface 84 which lies in a plane generally transverse to the axis of bore 28. Flange portion 82 is connected to the forward portion 80 of the alignment bushing 68 by a generally frusto-conical surface 86. Surface 86 and a corresponding surface 88 of valve body 20 define a bleed chamber 90 for a purpose to be described more fully hereafter.

In the preferred embodiment of the apparatus of this invention, seal washer 64, alignment bushing 68, valve needle 72 and valve body 20 are fabricated from Type 316 stainless steel. Other metals may be selected by one ordinarily skilled in the art depending upon the particular environment in which the valve is to be placed in service.

A packing nut 92 is threadedly received within valve body 20 through interengaging threads 94 defined on the packing nut and the valve body 20. Packing nut 92 includes an external hex surface 96 which is adapted to be engaged by a tool or other suitable instrument for the purpose of rotating the packing nut. The lower extremity of packing nut 92, as shown in FIG. 1, defines a driving surface 98 which lies in a plane generally parallel to thrust surface 84 of alignment bushing 68.

Disposed within packing nut 92 is a liner sleeve 100. Liner sleeve 100 includes a bore defining Acme threads 102 and a counterbore 104. Liner sleeve 100 is generally cylindrical in shape and is adapted to be received within packing nut 92 with the upper portion of the sleeve as shown in FIG. 1 engaging a shoulder 106 of the packing nut.

In the preferred embodiment of this invention, liner sleeve 100 is fabricated from brass or other similar metal whereas the packing nut itself and the stem are fabricated from Type 316 stainless steel. This arrangement tends to reduce galling of the threaded connection between the stem and the packing nut under high pressure conditions.

The two-piece structure including the packing nut 92 and the liner sleeve 100 lends itself to ease in manufacturing in that the threads 102 may be more readily formed in the sleeve with the sleeve thereafter disposed within the packing nut. Within the spirit of this invention, however, should be considered a one-piece packing nut in which the threads 102 are defined directly on the packing nut.

The upper portion of the packing nut is provided with a passageway 108 through which the valve actuating stem 109 protrudes.

The upper end of the valve actuating stem 109 as shown in FIG. 1 receives a valve handle 110. A rigid connection between the valve handle and the stem is provided by means of set screw 112 received within a tapped hole 115 of the valve handle and seated against a flat 114 of the valve stem. Access to set screw 112 may be had through passageway 116 of the valve handle.

The outer ends of the valve handle are outwardly flares as at 118 such that colored indicia in the form of plastic covering 120 may be shrunk in place or otherwise positioned about the exterior surface of the valve handle in order to designate the type of fluid passing through the valve. With indicia covering means shrunk in place about the valve handle, the outwardly flared portion 118 renders more difficult the inadvertent removal of the covering from the handle.

Threads 122 are provided on the actuating stem 109 and are adapted to cooperate with threads 102 defined by the liner sleeve 100. In the preferred embodiment of this invention, threads 122, 102 are of the Acme thread design for the purpose of providing thrust resistance against upward movement of the valve stem as the valve is pressurized. For this same purpose, the stem is threaded over a substantial length to insure that forces imposed on the threads are distributed over a broad area. While Acme threads have been found to be quite beneficial in the preferred embodiment of this invention, other thread forms well known to those skilled in the art may be considered equally within the scope of this invention.

The inner end of actuating stem 109 as shown in FIGS. 1 and 3 is enlarged being defined by a generally cylindrical surface 124 interconnected to the shank portion 126 of the stem by means of a tapered shoulder 128. It will be observed in FIG. 1 that the diameter of cylindrical surface 124 slightly exceeds the root diameter of threads 102 such that as the actuating stem 109 is backed out of the packing nut 92, a stop means will be provided as shoulder 128 abuts shoulder 130 defined by liner sleeve 100.

As is shown more clearly in FIG. 3, the inner end of actuating stem 109 is bifurcated with legs 132, 134 being defined by a cylindrical bore 136 intersected by a generally rectangular, axially directed slot 138 extending from bore 136 to the inner end of the actuating stem.

Cylindrical bore 136 is generally transverse to the axis 137 of the actuating stem 109 and together with slot 138 defines a chamber 140 for reception of one end of the valve needle 72 as will be described below.

VALVE NEEDLE

Valve needle 72 is defined by a cylindrical body 70, an enlarged generally spherical surface 144 at one end thereof and a tip 146 at the other end thereof.

As will be evident in FIGS. 1 and 3, the spherical surface 144 of the valve needle 72 does not define a full sphere but rather defines partial sphere; the extent of the spherical surface being more than a hemisphere but less than a full sphere. Within the spirit of this invention should be considered spherical surfaces of greater or lesser extent.

The diameter D (FIG. 3) of spherical surface 144 is approximately equal to the diameter D of the cylindrical bore 136 provided in the actuating stem 109. The breadth B of slot 138 as shown in FIG. 3 slightly exceeds the diameter of cylindrical body 70 of the needle 72, but is smaller in magnitude than the diameter D of bore 136. Thus, with the spherical surface 144 disposed within cylindrical bore 136 and cylindrical body 70 disposed within slot 138, a substantially line contact bearing zone will be established between the spherical surface 144 and the wall defining cylindrical bore 136. This line contact lies in the plane of either FIGS. 1 or 3.

It will be evident from FIGS. 1 and 3 that with the valve needle 72 disposed within the bifurcated end of actuating stem 109, the actuating stem will be otherwise free to rotate with respect to the valve needle. The line contact established between the spherical surface 144 and the wall defining cylindrical bore 136 permits a closing force to be imparted by the rotating actuating stem to the valve needle while at the same time maintaining friction at a minimum value thus to permit ready relative rotation of the valve needle and the actuating stem. Accordingly, the valve needle of this invention is nonrotating, i.e., rotary advancement of the actuating stem into the packing nut will produce a linear advancement of the valve needle into the valve seat without rotation of the valve needle relative to the sealing seat at the moment the needle and the slot contact one another.

The fit between the cylindrical body 70 of needle 72 and the members 64, 66, 68 is a sliding fit with a tolerance of about 0.0005 inches established between these members in the preferred embodiment. The cylindrical body 70 of the valve needle is thus guided and aligned with respect to the axis of the valve seat 30 such that tip 146 of the valve needle will be brought into precise engagement with the valve seat 30. Stated another way, the axis of the valve needle 72 and the axis of the valve seat 30 are very nearly coincident as the valve needle is guided by the respective members 64, 66 and 68.

It has been found that through the establishment of essentially line contact between the valve needle and the actuating stem that a substantial thrust force may be imparted to the valve needle by the valve stem without undue galling of the mating parts. In order to reduce still further the friction between the needle and the stem the spherical surface of the needle and the wall defining the stem bore may be coated with a suitable lubricant such as molybdenum.

As an optional feature, the preferred embodiment of this invention as shown in FIG. 1 is provided with a retaining ring 148 which is received in a peripheral recess 150 about the cylindrical surface 124 of the actuating stem. When in place as shown in FIG. 1, the retaining ring 148 serves to prevent outward expansion of the legs 132, 134 of the actuating stem, when the valve is under the influence of extremely high pressure. Retaining ring 148 thus insures that contact between the valve needle and the actuating stem will be along a line of substantial length. Obviously, any outward flaring of the legs 132, 134 would tend to reduce the length of the contact line between the actuating stem and the valve needle, with a resultant concentration of force over a smaller bearing zone. Such a contigency would tend to increase friction and galling with consequent impairment of valve function.

SEALING

Sealing member 66 serves to prevent leakage of fluid through counterbore 62. Upon application of a compressive force to thrust surface 84 of alignment bushing 68 by packing nut 92, sealing member 66 expands slightly into sealing engagement with the wall defining counterbore 62 and with the external surface of cylindrical body 70 of the valve needle 72, thus sealing off the upper portion of the valve assembly from contact with fluids passing through the valve. Such compressive force is applied to the sealing member 66 as by threadedly advancing the packing nut 92 into the valve body by means of a suitable wrench or other implement.

When the desired degree of compression of the sealing member 66 has been achieved, a keeper 22 as shown in FIGS. 1 and 2 is fixed in place with the twelve point surface 152 of the keeper engaging the hex surface 96 of the packing nut. The keeper 22 thus prohibits rotation of the packing nut 92 in a manner so as to relieve the compressive force applied to sealing member 66. A relieving of the compressive force on the sealing member will obviously promote leakage of fluid through the threads of the packing nut and the actuating stem. Even more seriously, excessive packing nut rotation could weaken the connection between the packing nut and body to such an extent that the stem assembly and the nut would be forcibly ejected under the influence of the pressure in the system.

In the event of leakage past the sealing member 66 along the wall of counterbore 62, a bleed chamber 90 and bleed hole 166 provide a passage for high pressure fluid venting to atmosphere thus to avoid exertion of undue thrust force against the various valve components. In the event of leakage past the exterior surface of needle 72, transverse slots 93 provided in the end of packing nut 92 and sleeve 100 establish communication between counterbore 104, passageway 78 and bleed hole 168.

NEEDLE TIP

The tip of the valve needle may take different forms within the spirit of this invention. The valve needle 72 of FIG. 1 includes a shut-off tip 146 which is defined by a conical surface 154 (FIG. 3) adapted to be brought into sealing engagement with the valve seat 30.

Other forms of tips for the valve needle may be employed within the spirit of this invention and several such forms are shown in FIGS. 6–8.

In FIG. 6, a valve needle is shown including a shut-off and control tip. The frusto-conical surface 156 of FIG. 6 provides a shut-off of the valve whereas the plug surface 158 is adapted to cooperate with the valve seat 30 in order to restrict flow through the valve in a controlled manner.

The valve needle of FIG. 7 is provided with a metering tip in the form of a relatively long frusto-conical surface 160. The valve metering tip of FIG. 7 is adapted to cooperate with the valve seat in order to provide varying flow of fluid through the valve depending upon the degree of insertion of the metering tip into the valve seat.

The valve needle of FIG. 8 is provided with a soft seat tip comprised of a frusto-conical surface 162 and a soft seating element 164.

All of the valve needles of FIGS. 6–8 have similar spherical surfaces 144 and cylindrical bodies 70. These valve needles are thus compatible with the actuating stem 109 of FIG. 1 and, depending upon the needle desired, may be readily inserted into the bifurcated end of the valve stem.

The method of assembly of the needle type valve of this embodiment can be understood with reference to FIGS. 1 and 4. The method steps are as follows:

1. providing a valve body 20 having inlet and outlet passageways 24, 26 and a valve seat 30 disposed therebetween;
2. providing a valve actuating stem 109 having a bifurcated inner end defined by a cylindrical bore 136 with an axially directed slot 138 extending from the bore to the inner end of the actuating stem, the slot having a breadth somewhat smaller in magnitude than the diameter of said bore;
3. providing a valve needle 72 having a tip 146 at one end thereof and a spherical enlarged surface 144 at the other end thereof;
4. disposing the valve needle and the stem in side-by-side relationship (as shown in FIG. 4) with the center of the spherical surface of the needle disposed along the axis of the cylindrical bore in the stem;
5. advancing the spherical surface of the valve needle into the cylindrical bore of the stem, and
6. attaching the valve stem in the valve body.

Also, the method contemplates the step of disposing an annular ring 148 about the bifurcated inner end of the actuating stem after advancing the needle into the stem as well as the step of plating or otherwise depositing on the spherical surface of the needle and/or on the wall defining the cylindrical bore of the stem, a lubricant prior to the mating of the respective parts.

ADVANTAGES OF THE INVENTION

One advantage of the subject embodiment is that the needle may be readily replaced in the event of damage to the needle or in those instances where it is desired to replace the needle with one of an alternate design.

The construction of the valve body and the cooperating needle including alignment and sealing elements provides a valve that is designed to handle difficult applications involving extreme pressure and where resistance to hazardous or corrosive fluids is required.

The alignment bushing 68 and cooperating seal washer 64 provide for accurate alignment of the valve needle with respect to the valve seat. The alignment bushing and seal washer further cooperate with the sealing member 66 to prohibit the leakage of fluid into the stem thread area of the valve where contamination of the fluid may take place. In addition, the alignment bushing and seal washer provide support for the valve needle which eliminates chatter of the needle under the influence of high pressure with the valve opened.

The cooperating ball of the valve needle and the cylindrical bore of the stem permit a substantial thrust force to be imparted to the needle by the stem without undue galling of the mating parts.

In the event that it is desired to replace the needle, the method of this invention provides for ready removal of the needle with replacement by an identical needle or a needle of an alternate design. There is thus great flexibility in the method and the operator can readily choose the valve function to suit his particular requirements by simply installing an appropriate needle using the method.

The rugged valve design provides for trouble free service over an extended period of time. The valve of this invention has been rated by the manufacturer at 60,000 p.s.i. working pressure. This is a conservative rating of the capabilities of the valve.

FIG. 9 shows a second embodiment of the invention and is quite similar to the embodiment of FIGS. 1 through 8. The primary difference between FIGS. 1 and 9 embodiments is in the arrangement provided for connecting the stem to the needle valve. Elements of the FIG. 9 embodiment which correspond to previously discussed elements of the FIG. 1 embodiment are identified by the same numerals differentiated from the FIG. 1 embodiment by the addition of a prime (') suffix. The description of one such element is to be taken as equally applicable to the other unless otherwise noted.

Figure 10:
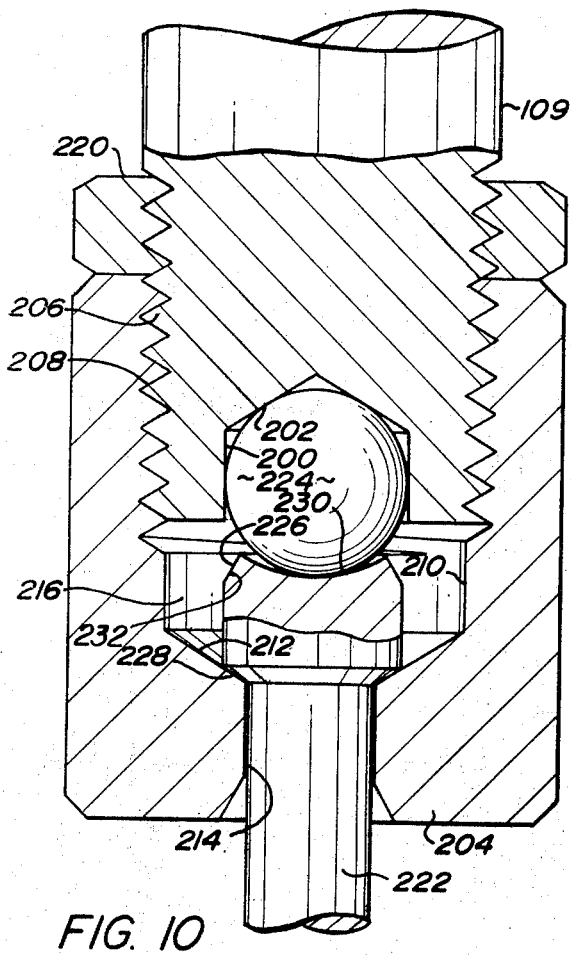
FIG. 10 is an enlarged cross-sectional view through the connecting means between the stem and the needle valve.

Although it forms no particular part of the invention, the valve body 20' is slightly different than the valve body 20 of the FIG. 1 embodiment in that the inlet passageway 24 extends axially inward from the lower end of the valve in a pattern which provides a right angle flow passage through the body of the valve. Of particular importance to the invention is the connecting arrangement provided between the valve stem and the needle valve. This arrangement is shown in detail in FIG. 10. In this embodiment, the lower end of the actuating stem 109' is provided with an inner bore 200 which terminates in a conical end wall 202. A collar member 204 is threadedly connected to the end of actuating stem 109' by cooperating threads 206 and 208. The collar 204 has an inner bore 210 which has an inclined conical lower wall 212. A bore 214 passes through the lower end of the collar and wall 212. In combination, the collar and the lower end of the actuating stem 109' define an enclosed chamber 216. The length of the chamber 216 is, of course, adjustable by adjustment of the collar on the stem. To maintain the collar in a desired position of adjustment, a locking nut 220 is positioned inwardly of the collar. The valve member 222 is carried from the stem by an arrangement which permits it to be freely rotatable relative thereto and by which axial play between the valve element and the actuating stem can be eliminated. In particular, a ball member 224 is carried within the bore 200 and sized so as to be closely received therein. The upper end of the valve element 222 is provided with a slightly enlarged portion 226. A shoulder 228 is formed about portion 226 at an angle corresponding to the angle of wall 212. The upper end of the portion 226 is provided with a concave surface 230 having a radius greater than the radius of the ball 224. Additionally, for reasons which will hereafter be discussed, the upper corner of portion 226 is inclined about its periphery as shown at 232. When the elements are assembled in the manner shown in FIGS. 9 and 10, the ball makes contact with only a small area in the center of the concave surface 230. Tilting of the valve element 222 is prevented by the cooperation of shoulder 228 and surface 212 together with the contact along the bore 214. It should be noted, however, that the valve element is freely rotatable relative to the stem. Thus, during a closing operation, the valve tip will not be scored by movement relative to the seat. If there is or should develop some slight axial play productive of backlash, the collar 204 can be adjusted to take up the backlash while still permitting free rotation of the valve element.

This is accomplished merely by releasing the lock nut 220 and tightening the collar 204 and thereafter retightening the lock nut.

Figure 11:
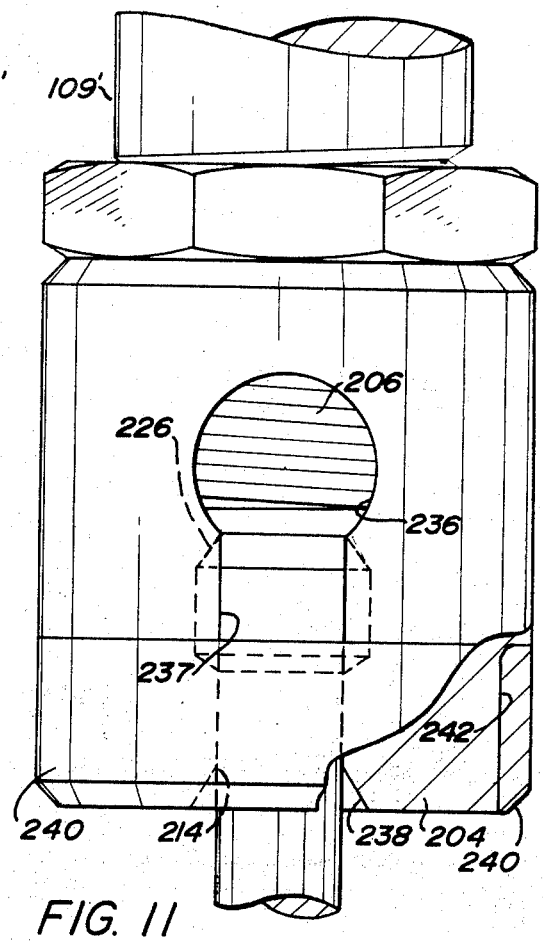
FIG. 11 is a view similar to FIG. 10 but showing a modified form of connecting means.

If the valve element 222 is of a diameter less than the diameter of bore 214 at all points beneath the enlarged end portion 226, then assembly of the device can be accomplished merely by dropping the valve stem down through the bore 214 from the top until the enlarged portion 226 engages end 212. Thereafter, the collar can be threaded on the actuating stem 109' until proper engagement is made with the ball 224. In many instances however, it is desirable to have the lower end of the valve element of a larger diameter than the bore 214. FIG. 11 shows an embodiment for use in such instances. As shown the collar 204 is preferably split throughout a portion of its lower section. In the subject embodiment, the split 237 extends from the lower wall up to a bored opening 236 which extends diametrically through the sleeve. This bifurcated sleeve arrangement allows the valve element to be snapped in and out of the chamber 216. Note that the inclined wall 226 can cam against the tapered wall 238 about the mouth of bore 214. Applying an axial thrust upwardly, the bifurcated sleeve is expanded, allowing the enlarged portion 226 to pass through the bore 214. The split collar can be prevented from opening up by a retaining ring 240 which is thereafter force fitted about its lower end of the shoulder of reduced diameter portion 242.

Figure 12:
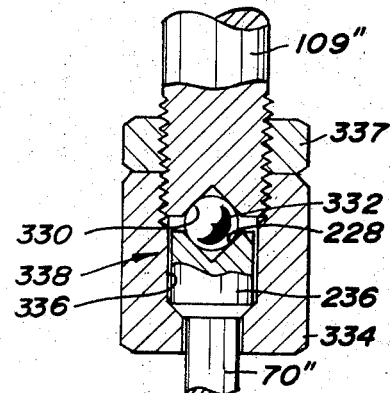
FIG. 12 illustrates in cross-section form a third embodiment of connecting means for the stem and the needle valve; and, FIG. 13 shows a further modification of the embodiment of FIG. 12.
Figure 13:
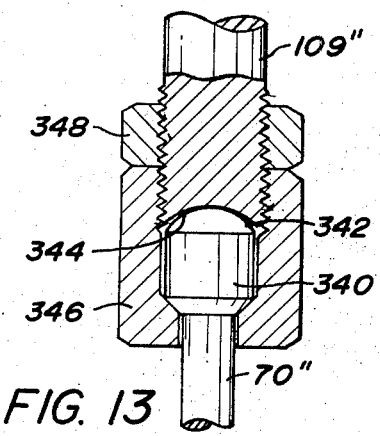

FIGS. 12 and 13 show two additional embodiments of the invention. In particular, FIG. 12 shows a connection between the valve needle 70" and the operating stem 109" which comprises an enlarged head portion 236 formed on the upper end of the valve needle. Portion 236 is provided with an inwardly extending, conically shaped recess 228. The lower end of the stem 109" is similarly provided with a conical recess 330. A ball 332 is positioned between recesses 228 and 330. The collar member 334 is formed generally the same as collar 204 of the FIGS. 9 and 10 embodiment. As shown, collar 334 has an inner bore 336 which defines a chamber 338 that encloses the ball 332 and the head portion 236. The collar is, of course, threadedly connected to the stem to permit adjustment for the elimination of back-lash. A lock nut 337 serves to lock collar 334 in position.

The FIG. 13 embodiment is quite similar to FIG. 12, however, in this embodiment the head portion 340 of valve needle 70" is provided with a convex upper surface 342. A concave surface 334 having a larger radius than surface 342 is formed on the lower end of stem 109". The collar 346 is identical to collar 334 of FIG. 12 and a lock nut 348 is arranged to lock collar 334 in its adjusted position.

What is claimed is:

1. A high pressure valve including:

a body having a valve chamber including means defining a seat, an actuating stem threadedly connected to said body for movement toward and away from said seat;

an elongated valve member;

said elongated valve member being connected to said stem by connecting means for permitting free rotation of said valve member relative to said stem;

said connecting means including at least one spherical surface between said stem and said valve member and a collar member surrounding the mating ends of said stem and said valve member, said valve member extending freely through an axial opening in said collar and having an enlarged head portion rotatably held within said collar;

said collar member being threadedly connected to said stem to provide adjustment means for permitting the contact force between said valve member and said stem to be adjusted, and, said enlarged head portion and said collar having generally conically-shaped engagement surfaces to limit tilting of said valve member relative to said head while permitting free rotation.

2. The valve as defined in claim 1 wherein said spherical surface is formed integrally with said valve member.

3. The valve as defined in claim 1 wherein said spherical surface is defined by a ball member positioned between said stem and said valve member.

4. The valve as defined in claim 1 including means for locking said collar member in position on said stem.

5. The valve as defined in claim 4 wherein said locking means includes a lock nut carried on said stem.

6. The valve as defined in claim 1 wherein said collar member is bifurcated at its lower end and said enlarged head portion of said valve member is sized such that it can spring said bifurcated end and be moved axially into and out of the lower end of said collar, and wherein means are provided for clamping about said bifurcations.

7. The valve as defined in claim 1 wherein said stem and said valve member both include mating spherical surfaces.

* * * * *

UNITED STATES PATENT OFFICE
CERTIFICATE OF CORRECTION

Patent No. 3,761,053    Dated September 25, 1973

Inventor(s) Alfred Bedo et al.

It is certified that error appears in the above-identified patent and that said Letters Patent are hereby corrected as shown below:

Column 4, line 59, "for" should read -- For --;

line 60, "outlines" should read -- outlined --.

Column 5, line 4, cancel "For" and insert -- Seal -- before "washer";

line 5, cancel "outlined" and insert -- diameter -- after "outside".

Column 6, line 13, "flares" should read -- flared --;

line 63, insert -- a -- after "defines".

Column 8, line 39, "168" should read -- 166 --.

Column 12, line 7, change the "," to -- ; --;

line 24, change the "," after "adjusted" to -- ; --.

Signed and sealed this 30th day of April 1974.

(SEAL)
Attest:

EDWARD M. FLETCHER, JR.
Attesting Officer

C. MARSHALL DANN
Commissioner of Patents